United States Patent [19]

Rourke et al.

[11] Patent Number: 4,880,187

[45] Date of Patent: Nov. 14, 1989

[54] MULTIPURPOSE MODULAR SPACECRAFT

[75] Inventors: Kenneth H. Rourke, Palos Verdes Estates; Raymond J. Hart, Villa Park, both of Calif.

[73] Assignee: TRW Inc., Redondo Beach, Calif.

[21] Appl. No.: 273,630

[22] Filed: Nov. 17, 1988

Related U.S. Application Data

[63] Continuation of Ser. No. 819,337, Jan. 16, 1986, abandoned, which is a continuation of Ser. No. 609,157, May 10, 1984, abandoned.

[51] Int. Cl.$^4$ ............................................. B64G 1/40
[52] U.S. Cl. ................................... 244/172; 244/158 R
[58] Field of Search ................... 244/158 R, 160, 161, 244/162, 172, 173

[56] References Cited

U.S. PATENT DOCUMENTS

| | | | |
|---|---|---|---|
| 3,262,654 | 7/1966 | Kaempen | 244/161 |
| 3,286,629 | 11/1966 | Laue | 244/172 |
| 3,608,848 | 9/1971 | Cantor et al. | 244/161 |
| 3,910,533 | 10/1975 | Cheatham et al. | 244/161 |
| 4,298,178 | 11/1981 | Hujsak | 244/161 |
| 4,326,684 | 4/1982 | Rosen | 244/172 |
| 4,395,004 | 7/1983 | Ganssle et al. | 244/158 R |
| 4,451,017 | 5/1984 | Marshall | 244/172 |
| 4,471,926 | 9/1984 | Steel | 244/158 R |
| 4,557,444 | 12/1985 | Jackson et al. | 244/172 |

FOREIGN PATENT DOCUMENTS

| | | | |
|---|---|---|---|
| 1044780 | 10/1966 | United Kingdom | 244/172 |
| 2091194 | 7/1982 | United Kingdom | 244/158 R |

OTHER PUBLICATIONS

"Orbit to Orbit Transtage for Space Shuttle", Martin Marietta brochure, Jan. 1974.
Dr. D. Harris, 'The Modular Power Subsystem for the Multimission Modular Spacecraft', Proceedings of the 15th Intersociety Energy Conversion Engineering Conf., San Diego, CA, Aug. 1978.

*Primary Examiner*—Sherman D. Basinger
*Assistant Examiner*—Rodney Corl
*Attorney, Agent, or Firm*—James M. Steinberger; Sol L. Goldstein

[57] ABSTRACT

A multipurpose modular spacecraft is adaptable quickly and easily for performing a variety of short- and long-range space missions, such as on-orbit maintenance missions and the like. The multipurpose modular spacecraft comprises a fully integrated short-range space vehicle including one or more relatively small modular propulsion sets which provide propulsion capability for relatively short-range missions and close-in maneuvering requirements. Longer-range propulsion capability is provided by a comparatively larger propulsion module designed for removable nested mounting within an open-sided chamber in the short-range vehicle. Relatively simple and easily operated latch mechanisms retain the propulsion sets and the propulsion module on the short-range space vehicle in preselected positions with relatively simple electrical fittings connected together to provide a control interface with the short-range space vehicle. The propulsion sets and/or the propulsion module can be replaced or removed as required to refuel the modular spacecraft or to adapt the spacecraft for a particular space mission.

33 Claims, 4 Drawing Sheets

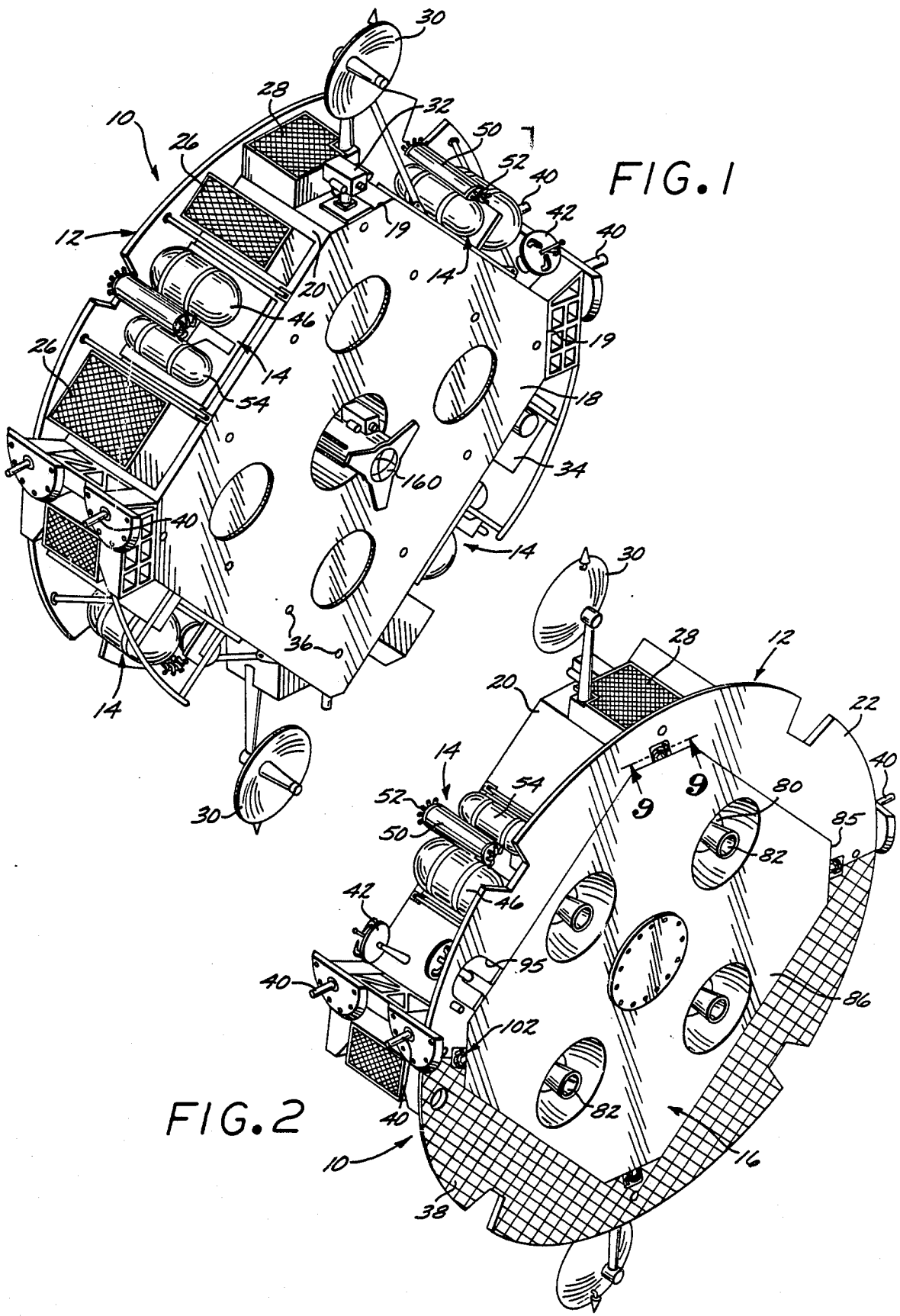

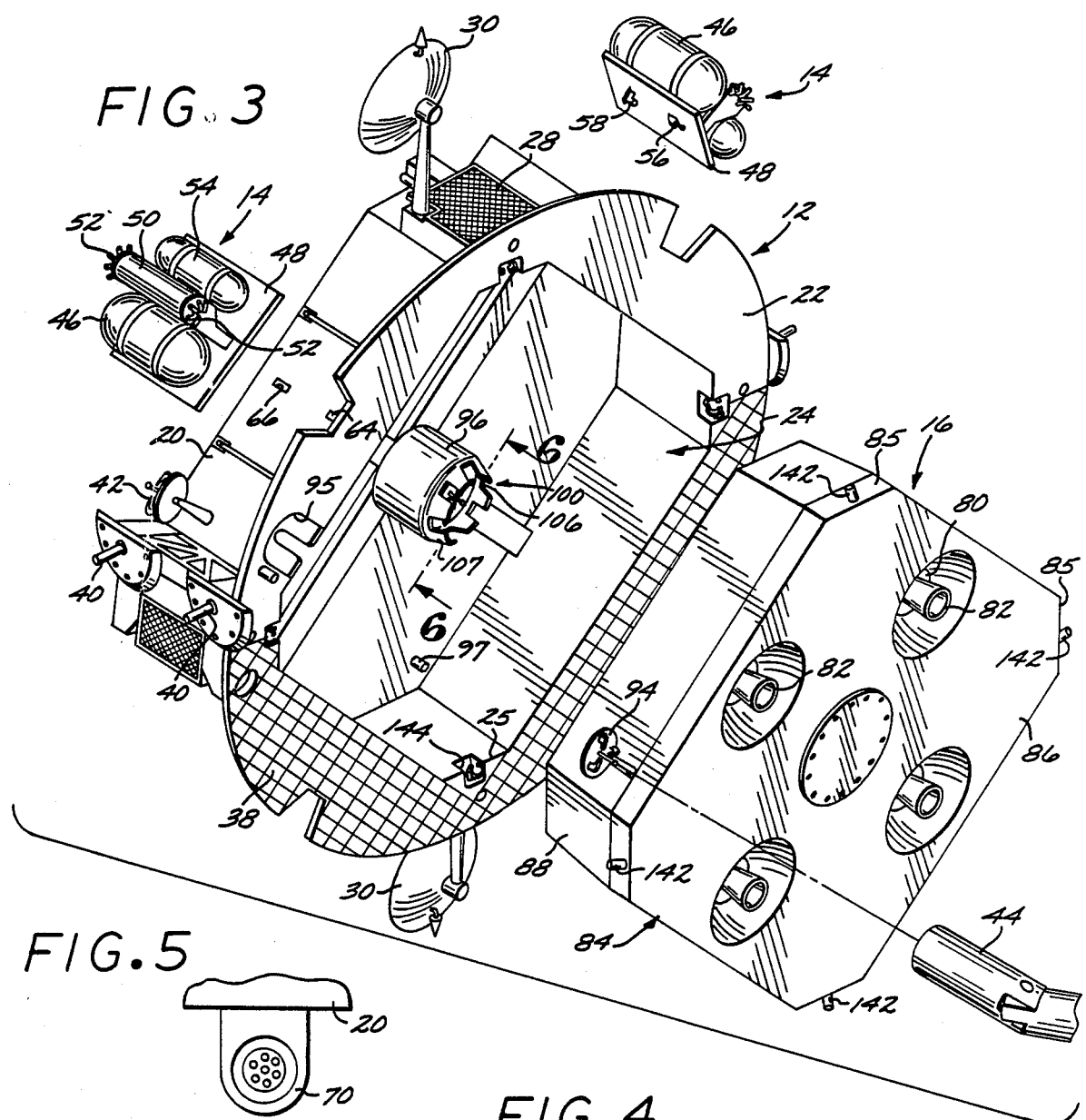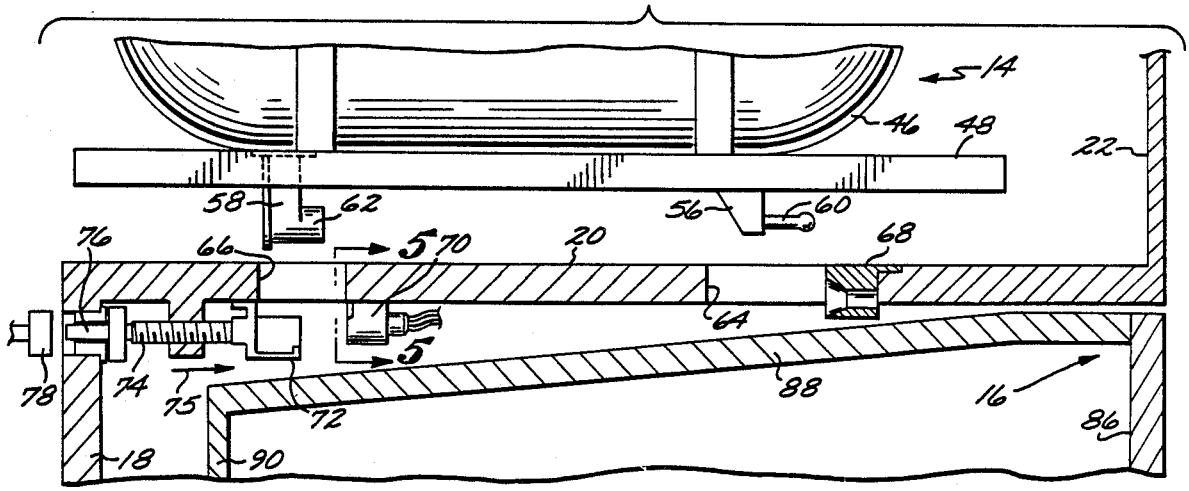

MULTIPURPOSE MODULAR SPACECRAFT

This application is a continuation of application Ser. No. 819,337, filed Jan. 16, 1986, which is a continuation of Ser. No. 609,157 filed May 10, 1984, both now abandoned.

BACKGROUND OF THE INVENTION

This invention relates generally to the field of spacecraft design. More particularly, this invention relates to an improved spacecraft design having a novel modular construction to permit rapid adaptation for performing a wide range of different space missions.

In the past, spacecraft and propulsion stages therefor generally have been designed for a single use and for performing a single specific space misssion. In this regard, the design of the spacecraft including, for example, size, shape, payload, avionics equipment, propulsion capacity, and electrical power storage and regeneration capacity, generally has been tailored uniquely for substantially optimum performance of the intended space mission without concern for satisfying any other mission or operational requirements. When the intended space mission is completed or otherwise terminated, for example, by a premature equipment malfunction, utility of the spacecraft for practical purposes is ended. Accordingly, performance of different space missions has generally required independent design, assembly, and launching of entirely different types of space vehicles, each designed for performing its own specific space mission— an approach which is both extremely costly and time consuming. Alternatively, continuation of the mission of an expired or malfunctioned spacecraft has generally required launching of a similarly equipped spacecraft, since access to a spacecraft in outer space for retrieval, maintenance, and/or resupply has generally been extremely difficult, costly, and sometimes impossible.

In recent years, major emphasis has focused upon the design of reusable manned spacecraft which can be launched from Earth into outer space to perform a upon the design of reusable manned spacecraft which can be launched from Earth into outer space to perform specified mission or missions and then return to Earth for repair, refueling, and resupply for a subsequent space mission. One such spacecraft design referred to commonly as the Shuttle Orbiter has been tested successfully by the U.S. Government and, very recently, has been used to capture a malfunctioned satellite for on-orbit repair and release. However, reusable spacecraft proposed to date, such as the Shuttle Orbiter, have generally comprised relatively large space vehicles designed primarily for safe launching of humans and cargo into space and for subsequent return to Earth, with little concern for energy-efficient maneuvering capability throughout a broad range of different missions and operational requirements while in outer space. Moreover, such spacecraft generally have not included any practical in-space refueling capability, thereby limiting maneuvering freedom, for example, to move from one orbit to another for performing different space missions.

There exists, therefore, a significant need for an improved spacecraft designed for rapid, easy, and safe adaptation while in space for performing a wide variety of different space missions in an energy-efficient manner. Moreover, there exists a need for an improved spacecraft designed for rapid, easy, and safe in-space refueling. The present invention fulfills these needs and provides a variety of additional related advantages.

SUMMARY OF THE INVENTION

In accordance with the invention, a multipurpose modular spacecraft is provided which can be adapted quickly and easily in space for performing a wide variety of different space missions in an energy-efficient manner. The improved spacecraft comprises a fully integrated short-range space vehicle designed to accept and interface with one or more self-contained modular propulsion units of different sizes and different propulsion capacities in accordance with the requirements of a particular space mission. Relatively simple and easily operated latch mechanisms support the propulsion units on the short-range vehicle in predetermined positions and with relatively simple electrical fittings coupled together to provide a control interface with the short-range vehicle.

In one preferred form of the invention, the propulsion units comprise a plurality of relatively small propulsion sets of a size for providing propulsion requirements for relatively short range missions and close-in maneuvering. In addition, a comparatively larger propulsion module of significantly greater propulsion capacity is provided for meeting propulsion requirements of relatively long-range space missions. The multipurpose spacecraft can thus be used in a short-range configuration of relatively light payload with the propulsion module omitted or in a longer-range configuration with the propulsion module included. In either configuration, the propulsion sets and/or the propulsion module can be replaced quickly and easily in space to refuel the modular spacecraft without requiring transfer of any propellants or fluids in the space environment.

The short-range space vehicle is preferably formed with a convenient size and shape for safe and volume-efficient transport into space within the cargo bay of a larger mother spaceship, such as the Shuttle Orbiter, and is released in space to perform a variety of different space missions. In this regard, in one preferred form, the short-range vehicle has a generally cylindrical shape of relatively low profile, minimum axial dimension and includes outer support means for seated retention of the short-range vehicle within the typically cylindrical cargo bay of the mother spaceship. Selected avionics, communication, and other equipment is removably installed in modules about the periphery of the short-range vehicle for facilitated access as required. The relatively small propulsion sets are each removably mounted in preselected positions about the periphery of the short-range vehicle by means of a simple latch mechanism including interengageable male and female latch components in combination with a movable locking foot for retaining the latch components in engaged relation. When these latch components are engaged, a pair of mating electrical fittings respectively on the propulsion set and the short-range vehicle are also interconnected to provide an electrical control interface through which the propulsion set can be controlled.

The short-range vehicle includes a relatively large open-sided chamber in the rear axial face thereof for mating nested reception of the propulsion module. This propulsion module is retained within the chamber by relatively simple latch mechanisms including, for example, outwardly projecting trunnion pins on the propulsion module which are releasably retained by respective latch units each including a pair of movable latch jaws for locking about one of the trunnion pins. For additional support, a support tube on the short-range vehicle projects rearwardly from an axially centered position within the open-sided chamber for mating reception into a central tunnel tube on the propulsion module, and this support tube carries a plurality of movable latch cranks for releasably retaining striker plates on the propulsion module within recessed seats on the support tube. When the propulsion module is mounted on the short-range vehicle, mating electrical fittings are interconnected to provide an electrical control interface through which propulsion module operation can be controlled.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a front perspective view of a multipurpose modular spacecraft embodying the novel features of the invention;

FIG. 2 is a rear perspective view of the multipurpose modular spacecraft illustrated in a relatively long-range mission configuration;

FIG. 3 is a rear perspective view of the spacecraft similar to FIG. 2 but illustrating the spacecraft in exploded form to include a short-range space vehicle, modular propulsion sets of a relatively small size, and a larger propulsion module;

FIG. 4 is an enlarged fragmented, partially exploded sectional view of a portion of the spacecraft, shown somewhat in schematic form, illustrating outer latch mechanisms for releasable mounting of the propulsion sets onto the short range vehicle;

FIG. 5 is an enlarged fragmented sectional view taken generally on the line 5—5 of FIG. 4;

DETAILED DESCRIPTION OF THE PREFERRED EMBODIMENT

Figure 6:
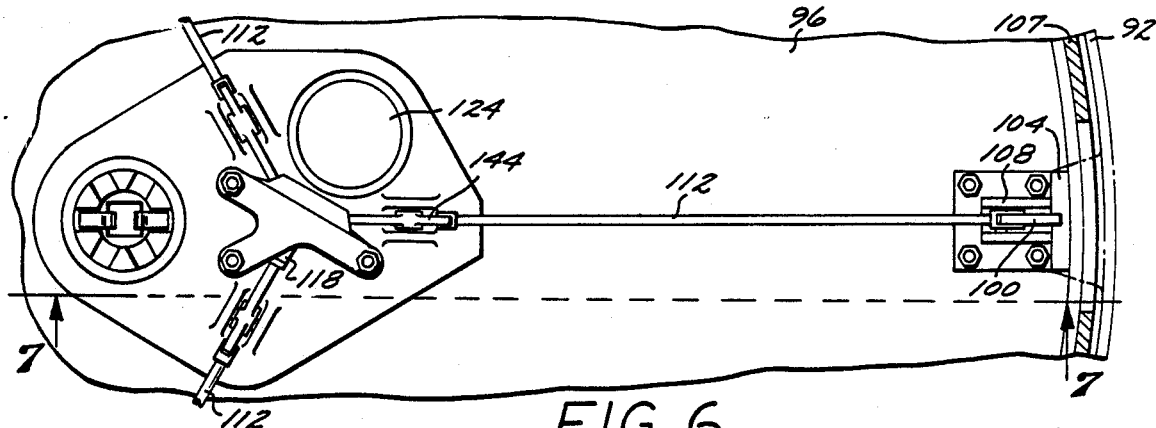
FIG. 6 is an enlarged fragmented sectional view taken generally on the line 6—6 of FIG. 3, illustrating a central latch mechanism for releasable mounting of the propulsion module onto the short-range vehicle.
Figure 7:
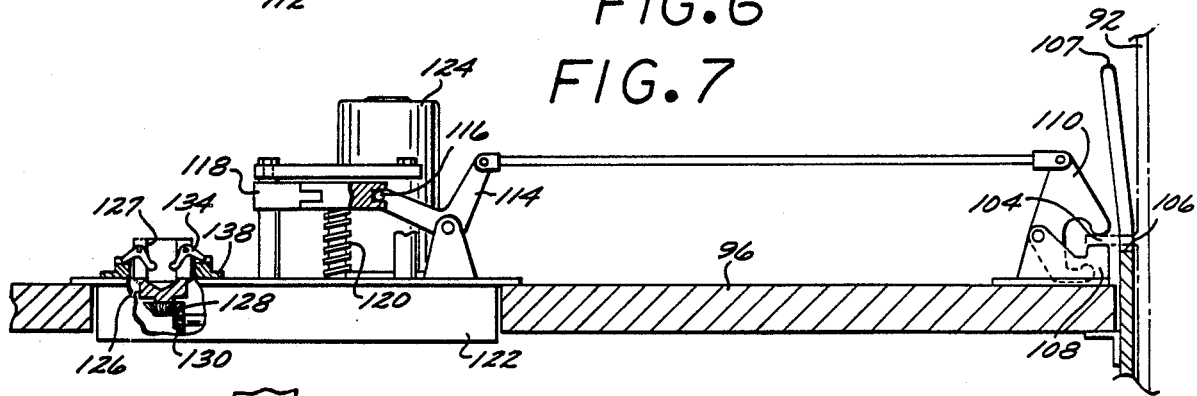
FIG. 7 is an enlarged fragmented sectional view taken generally on the line 7—7 of FIG. 6, with portions broken away to illustrate construction details of the central latch mechanism.
Figure 8:
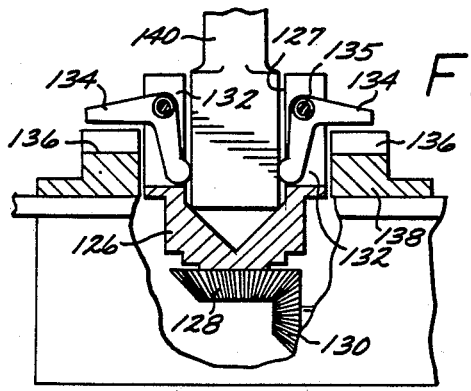
FIG. 8 is a further enlarged sectional view similar to a portion of FIG. 7 and having portions broken away to illustrate construction details of the central latch mechanism.

As shown in the exemplary drawings, a multi-purpose modular spacecraft referred to generally by the reference numeral 10 is provided for efficient performance of a variety of different space missions. The multipurpose spacecraft 10 comprises a fully integrated short-range space vehicle 12 removably carrying a plurality of relatively small modular propulsion sets 14 which provide relatively short-range propulsion capability and close-in maneuvering requirements. In addition, the short-range vehicle 12 removably supports a comparatively large propulsion module 16 which provides relatively long-range propulsion capability.

The multipurpose spacecraft 10 of the present invention is designed for rapid adaptation to perform a wide variety of short- or long-range space missions in an energy efficient manner. More particularly, the spacecraft 10 can be used in a short-range configuration including the short-range vehicle 12 and the propulsion sets 14 and omitting the relatively large propulsion module 16, thereby providing a relatively light payload which can be propelled through short range missions using only the limited propulsion capability of the propulsion sets 14. Alternatively, the spacecraft 10 can be operated in a relatively long-range configuration with the propulsion module 16 mounted on the short-range vehicle 12, thereby providing substantially increased overall propulsion capacity. In either configuration, the improved spacecraft 10 can be used to perform any of a wide variety of space missions including, for example, on-orbit maintenance of satellites, capture of disabled satellites and transport thereof to another spaceship for repair, placement of a new or repaired satellite in a selected orbit, transporting a satellite from one orbit to another, transport of humans from one location to another, or any other desired space mission. Importantly, the spacecraft 10 can be refueled as required in space by simple modular replacement of the propulsion sets 14 and/or the propulsion module 16 without requiring in-space transfer of propellants or other fluids.

The improved modular spacecraft 10 is designed particularly for convenient transport into space within the cargo bay of another larger mother spaceship, such as the Shuttle Orbiter or the like. In this regard, the improved modular spacecraft 10 has a size and shape for safe space-efficient transport within the cargo bay of the mother spaceship with the propulsion module 16 advantageously mounted in mating nested relation within the short-range vehicle 12 for substantially minimizing the cargo bay volume occupied by the modular spacecraft 10. In outer space, the spacecraft 10 is adaptable quickly and easily within or in close proximity to the mother spaceship with propulsion capability satisfying the appropriate mission requirements. The modular spacecraft is designed to function independently from the mother spaceship leaving therefrom and returning as necessary in performing various space missions, with refueling being accomplished quickly and easily by simple changing of the propulsion sets 14 or the propulsion module 16 with replacement propulsion units which have been prefueled on Earth and carried by the mother spaceship into space. The modular spacecraft 10 can be returned to the cargo bay of the mother spaceship and returned to Earth, or the spacecraft 10 can be left in space and retrieved by the mother spaceship for reuse at a later date.

As shown in FIGS. 1-3, which illustrate one preferred form of the invention, the short-range vehicle 12 of the multipurpose modular spacecraft 10 has an overall generally cylindrical shape with a relatively low profile, substantially minimum axial dimension. The short-range vehicle 12 is defined by a relatively flat front faceplate 18 of a generally rectangular shape with truncated corners 19 and joined about its perimeter to a rearwardly extending outer peripheral wall 20. This outer wall 20 in turn is joined at the axial rear side of the space vehicle to an outwardly projecting rear faceplate 22 having a generally circular perimetral shape. Importantly, as shown best in FIG. 3, the rear faceplate 22 and the outer wall 20 cooperate to define a relatively large and rearwardly open chamber 24 for mating nested reception of the propulsion module 16 within the interior of the short-range vehicle 12, as will be described in more detail.

The outer peripheral wall 20 of the short-range space vehicle 12 provides a convenient and externally accessible support platform for mounting of appropriate avionics and other equipment required in the performance of various space missions. More particularly, the outer wall 20 defines a plurality of mounting stations for the various equipment, preferably in interchangeable modular form to accommodate simple and rapid component replacement in the event of failure. As shown by way of example in the exemplary drawings, such avionics and other equipment may include appropriate computers 26, transponders 28, antennae 30, cameras 32, radar 34, and other selected equipment systems which may be necessary or desirable for spacecraft control and/or the performance of a particular space mission. In addition, navigation lights 36 may be incorporated into the front faceplate 18 and a solar cell array 38 may be incorporated onto a portion of the rear faceplate 22. Moreover, outer support arms 40 may be installed at appropriate intervals about the outer wall 20 for seated mounting of the short-range vehicle 12 within the cargo bay of a larger or mother spaceship, such as the Shuttle Orbiter or the like, and a grapple fixture 42 of standard design is desirably mounted on the outer wall 20 for appropriate grasping by a standard remote control manipulator arm 44 (FIG. 3) of the type commonly provided with the mother spaceship (not shown) for removing and retrieving equipment with respect to the cargo bay.

As shown best in FIGS. 3-5, the plurality of propulsion sets 14 are included as modular self-contained engine assemblies for removable installation at predetermined positions about the peripheral wall 20 of the short-range vehicle 12, with four of said propulsion sets being shown by way of example in the illustrative drawings. Each of these propulsion sets comprises a relatively small platform 48 upon which is mounted a fuel tank 46 containing a combustible propellant for supply to and combustion within a compact combustor 50, resulting in outward exhaust of combustion products through selected ones of a plurality of thrust nozzles 52. The particular thrust nozzles 52 are selected and controlled by the avionics equipment to provide controlled thrust forces propelling the vehicle in a selected direction and at a selected speed. The quantity of propellant carried by each propulsion set 14 is chosen to provide the short-range vehicle 12 with sufficient propulsion capacity for relatively short-range missions, having a length on the order of about 100 miles from the mother spaceship. In addition, each propulsion set 14 desirably includes a storage tank 54 containing an appropriate compressed gas which can be exhausted through the thrust nozzles 52 in a controlled manner known in the art for contaminant-free close-in maneuvering of the short-range vehicle 12.

Each of the plurality of propulsion sets 14 is adapted for rapid, simplified electrical and mechanical interfacing with the short-range vehicle 12. More particularly, as shown in FIGS. 4 and 5, the platform 48 of each propulsion set 14 carries a pair of depending brackets 56 and 58 which respectively support a rearwardly projecting male latch component 60 and male electrical fitting 62. These brackets 56, 58 are receivable downwardly, as viewed in FIG. 4, through a pair of slots 64 and 66, respectively, formed in the outer peripheral wall 20, thereby aligning the male latch component 60 with a female latch component 68 and the male electrical fitting 62 with a female electrical fitting 70 generally at the inboard side of the outer wall 20. A locking foot 72 is supported at the end of a lead screw 74 mounted on the short-range vehicle 12 and this locking foot 72 may be advanced upon lead screw rotation toward the bracket 58 in the direction of arrow 75 in FIG. 4 for sliding the propulsion set 14 toward a locked position with the male latch component 60 and electrical fitting 62 connected and respectively retained within the female latch component 68 and electrical fitting 70. Such lead screw rotation may be obtained conveniently by rotating an accessible hexhead end 76 with any suitable power-driven or manual tool 78.

When installed on the outer wall 20 of the short-range space vehicle 12, the propulsion sets 14 are controllable by the various avionics equipment for propelling the short-range vehicle 12 during relatively short-range space missions. Importantly, these propulsion sets 14 are provided in a convenient modular form which do not require any transfer of propellant or other fluid between the propulsion sets 14 and any other portion of the modular spacecraft. All connections between the propulsion sets 14 and the short-range vehicle 12 are relatively simple and are mechanical or electrical in nature thereby accommodating rapid propulsion set removal upon retraction of the associated locking foot 72. Accordingly, when fuel or compressed gas supply of any propulsion set 14 reaches an unacceptably low level, the space vehicle 12 can be refueled quickly and easily by simple interchanging with a fresh fully fueled propulsion set.

The propulsion module 16 also comprises a self-contained propulsion engine assembly and is adapted for removable attachment onto the short-range space vehicle 12 by relatively simple mechanical and electrical interfaces. More particularly, the propulsion module 16 includes a plurality of propulsion engines 80 having rearwardly directed thrust nozzles 82 through which high energy combustion products are exhausted to provide propulsive thrust forces for the spacecraft. These engines 80, four of which are shown in the exemplary drawings, include appropriate combustors and fuel supplies housed within the propulsion module but not shown in the drawings for sake of convenience only.

Figure 11:
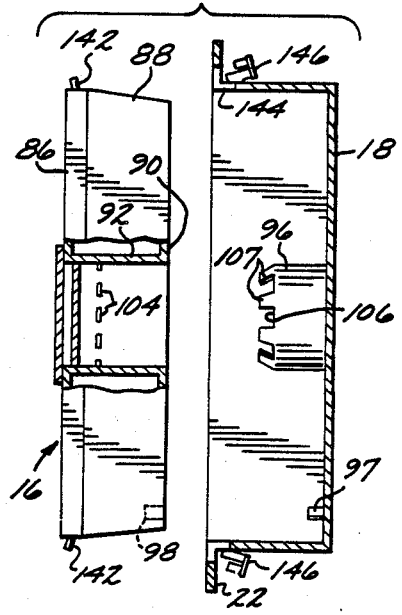
FIG. 11 is an exploded side elevation view, shown in schematic form and illustrating removable installation of the propulsion module into the short-range vehicle.

As shown best in FIGS. 3 and 11, the propulsion module 16 comprises a generally rectangular housing 84 within which the engines 80 are mounted. This housing has a generally rectangular shape with truncated corners 85 for mating nested reception into the open-sided chamber 24 of the short-range vehicle 12. The thrust nozzles 82 of the engines 80 open rearwardly through a rear housing faceplate 86, and a housing sidewall 88 extends forwardly from the faceplate with a slight taper in a radially inward direction toward an axial centerline of the propulsion module. At the front of the propulsion module, the sidwall 88 is joined to a front panel 90 which supports in turn a central tunnel tube 92 of generally cylindrical shape opening in a forward direction.

The propulsion module is easily inserted into the open-sided chamber of the primary space vehicle 12 by the remote manipulator arm 44 of the mother spaceship which grasps a grapple fixture 94 mounted on the housing sidewall 88 and inserts the module 16 into the chamber 24 with the grapple fixture 94 passing through a target opening 95 in the rear faceplate 22. This aligns the truncated corners 85 of the module housing 84 with corresponding truncated corners 25 of the open-sided chamber 24 and further centers the forwardly open tunnel tube 92 for sliding reception of a support tube 96 projecting rearwardly from an axially centered position within the chamber 24. Such propulsion module insertion is accompanied by interconnection of a female electrical fitting 97 on the short-range vehicle 12 with a male electrical fitting 98 on the front panel 90 of the propulsion module 16 such that the propulsion module 16 may be operationally controlled by the avionics equipment incorporated into the short-range vehicle 12.

The propulsion module 16 is removably retained within the open-sided chamber 24 of the short-range vehicle 12 by relatively simple latch mechanisms. More specifically, as shown in FIGS. 3 and 6–10, the propulsion module 16 is releasably locked within the chamber 24 in nested relation within the short-range vehicle 12 by a central latch mechanism 100 cooperating between the tunnel tube 92 and the support tube 96, and further by a plurality of trunnion latch mechanisms 102 cooperating respectively between the truncated corners 85 and 25 of the module 16 and the rearwardly open chamber 24.

The central latch mechanism is shown in detail in FIGS. 3, and 6–8 to include a plurality of striker plates 104 projecting radially inwardly from the inner diameter surface of the tunnel tube 92. These striker plates are circumferentially arranged for sliding reception into a plurality of recessed slots 106 formed between radially inwardly tapered fingers 107 at the rearmost end of the support tube 96. These striker plates 104 are releasably retained in seated engagement upon anvils 108 adjacent the bases of the recessed slots 106 by movable latch cranks 110 pivoted onto the anvils 108.

The latch cranks 110 are movably positioned by radially inwardly extending connector links 112 having inner ends connected to one end of an associated bell crank 114 centrally pivoted on the end of the support tube 96 and having a cam follower 116 at its opposite end constrained for movement within an elongated cam slot in a drive plate 118. This drive plate 118 moves on a lead screw 120 rotatably driven by the single output of a twin input differential unit of conventional design encased within a differential housing 122. A reversible electric motor 124 of a type incorporating an internal brake reversibly drives the lead screw 120 through the differential unit to advance or retract the drive plate 118, thereby pivoting the latch cranks 110 to retain or release the striker plates 104.

The electric drive motor 124 rotationally drives one of the inputs to the differential unit, the other differential unit input being normally locked by a key 126 (FIGS. 7 and 8) including an open hexhead socket 127 and a lower bevel gear 128 in meshed relation with another bevel gear 130 comprising the second differential unit input. This key 126 further includes open side slots 132 within which are journaled a pair of L-shaped lock pins 134 normally biased by springs 135 in the absence of tool insertion into the socket 127 toward pin reception into locking recesses 136 in adjacent blocks 138. However, in the event of failure of the electric motor 124 the internal motor brake (not shown) normally locks the motor input, whereupon the second differential unit input can be rotatably driven by an appropriate back-up drive tool 140 inserted into the socket 127 and appropriately rotated either manually or with power means. Insertion of the tool 140 pivots the lock pins 134 for withdrawal from the lock recesses 136, thereby permitting tool-driven rotation of the key 126 and corresponding pivoting movement of the latch cranks 110.

Figure 9:
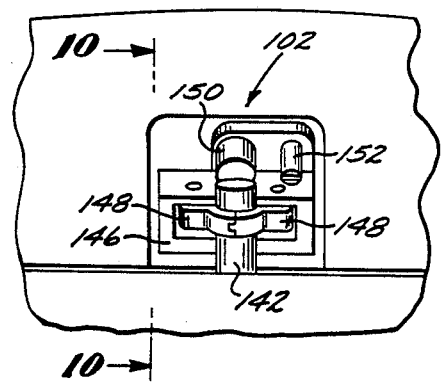
FIG. 9 is an enlarged fragmented sectional view of a portion of the spacecraft taken generally on the line 9—9 of FIG. 2, illustrating a trunnion latch mechanism for releasable mounting of the propulsion module onto the short-range vehicle.
Figure 10:
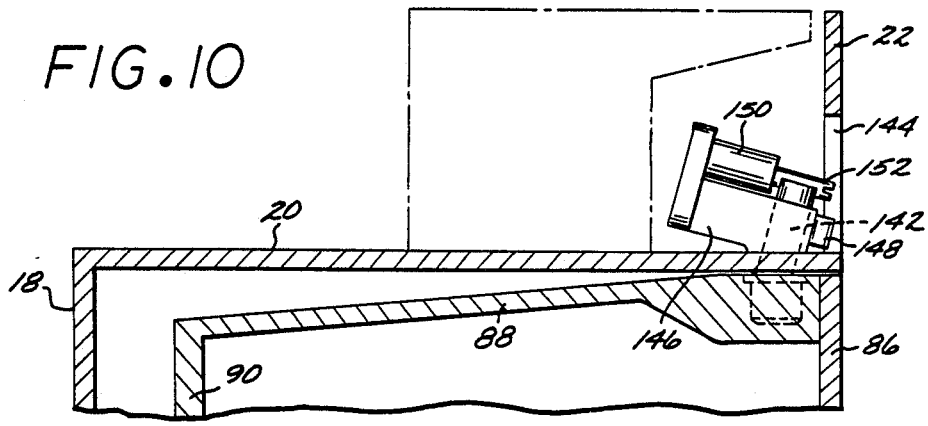
FIG. 10 is a further enlarged fragmented sectional view of a portion of the spacecraft, depicted somewhat in schematic form, taken generally on the line 10—10 of FIG. 9.

The trunnion latch mechanisms 102 are shown in detail in FIGS. 3, 9, and 10. As shown, each truncated corner 85 of the propulsion module housing 84 includes a radially outwardly projecting trunnion pin 142. When the propulsion module 16 is inserted into the chamber 24 of the short range vehicle 12, the trunnion pins 142 slide through slots 144 in the rear faceplate 22 each into engagement with a latch housing 146 mounted on the outer peripheral wall 20. A pair of movable latch jaws 148 protrude from the latch housing 146 and are normally separated to receive the trunnion pin 142, after which the latch jaws 148 are closed upon one another to maintain said pin in seated engagement against the latch housing 146.

The latch jaws 148 of each trunnion latch mechanism 102 are displaced by a reversible electric-powered motor 150 generally of the same type as the motor 124 (FIG. 7), wherein this motor 150 is coupled to the latch jaws 148 through a conventional twin input/single output differential unit housed within the latch housing 146. The electric motor 150 drives one of the inputs of the differential unit to open or close the latch jaws 148, with the other input to the differential unit being normally locked, as by the same type of key shown in FIG. 8 with respect to the central latch mechanism 100. Conveniently, the motor 150 is selected to include an internal brake for locking the associated motor input to the differential unit in the event of motor failure, whereupon the other input to the differential unit can be unlocked manually and rotatably driven via an auxiliary input tool 152 to operate the latch jaws 146.

Figure 12:
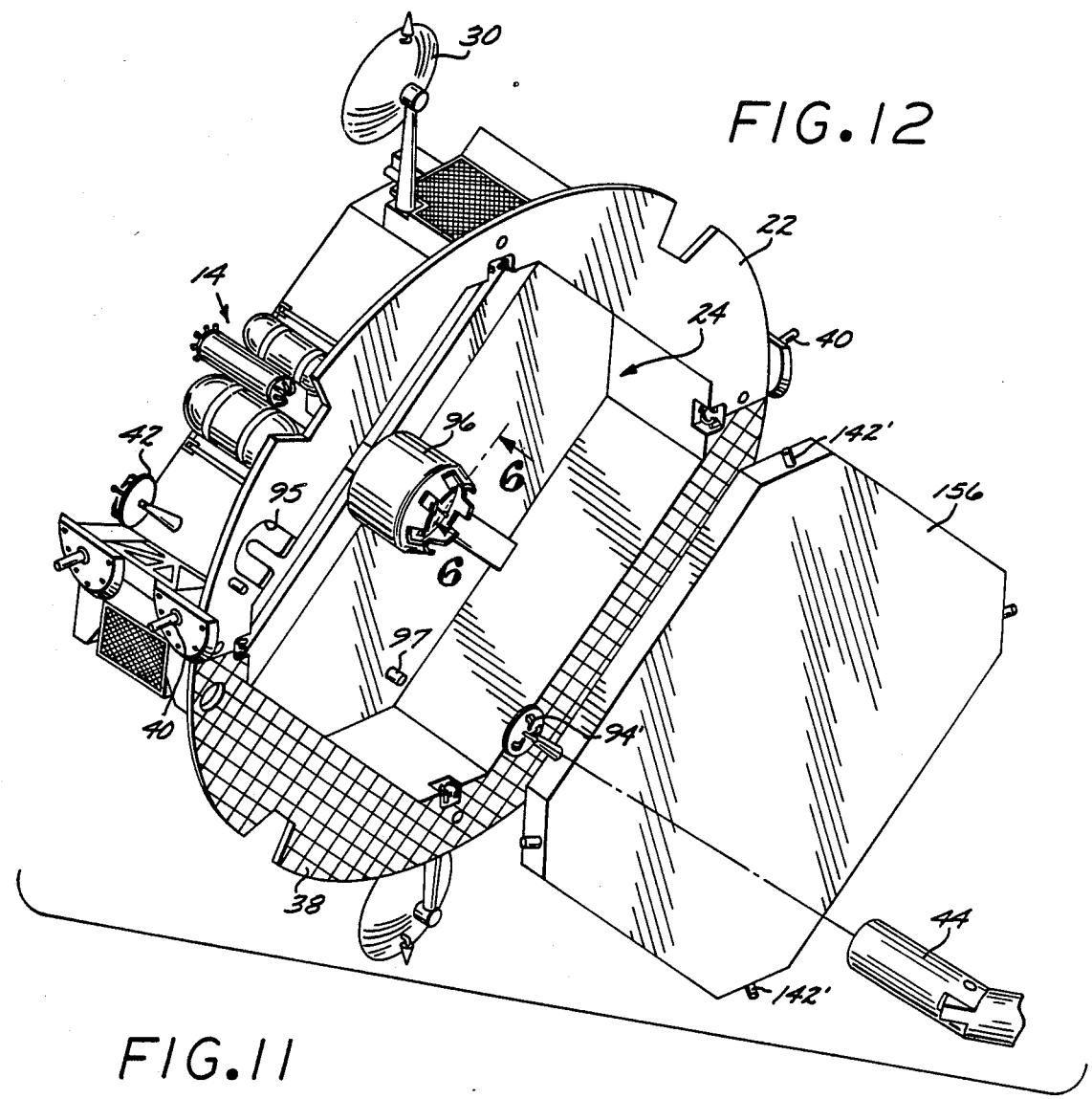
FIG. 12 is an exploded rear perspective view similar to FIG. 3 but illustrating installation of a close-out plate onto the short-range vehicle in lieu of the propulsion module, thereby placing the spacecraft in a relatively short-range mission configuration.

In operation, the short-range space vehicle 12 can be used for selected relatively short-range missions with the propulsion module 16 omitted thereby providing a relatively light, energy-efficient payload. The propulsion module 16 may be removed prior to such short-range mission by appropriate operation of the central and trunnion latch assemblies 100 and 102 to permit withdrawal of the propulsion module 16 using the remote manipulator arm 44 of the mother spaceship. During such short-range mission, a close-out plate 156, as shown in FIG. 12, of an appropriate lightweight and preferably thermal barrier construction may be installed onto the short-range vehicle 12 to enclose the chamber 24, with said close-out plate 156 including an appropriate plurality of trunnion pins 142' and a grapple fixture 94' for mounting onto the space vehicle 12 in the same manner as described above with respect to the propulsion module 16.

However, for longer-range missions, the close-out plate 156 can be removed quickly and easily from the primary space vehicle and the propulsion module 16 can be installed to substantially increase propulsion capacity and overall mission range of the combined modular spacecraft. Upon completion of a short- or long-range mission, any one or all of the propulsion sets 14 and/or the propulsion module 16 can be replaced by new units containing full supplies of fuel thereby refueling the spacecraft without requiring any fluid transfer in an outer space environment.

Figures 13, 14:
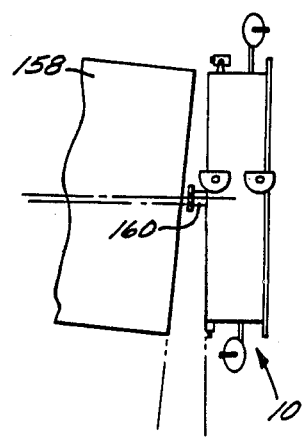
FIG. 13 is a schematic illustration depicting one operation of the multipurpose spacecraft in a docking maneuver with respect to another spacecraft.
FIG. 14 is a schematic illustration depicting the multipurpose spacecraft docked with the other spacecraft.

The multipurpose modular spacecraft 10 of the present invention can be used to perform a wide variety of different space missions. By way of example, for purposes of illustration only, the spacecraft 10 can be propelled from a mother spaceship into close proximity (FIGS. 13 and 14) with another satellite 158 for on-orbit maintenance of that satellite such as by capture and return to the mother spaceship for maintenance purposes. In this regard, the multipurpose spacecraft 10 may include a remote controlled docking mechanism 160 installed within the support tube 96 and extensible forwardly therefrom as shown in FIG. 13 for engaging a conventional grapple fixture (not shown) on the other satellite 158. The spacecraft 10 can be maneuvered by appropriate control into docked relation with the satellite 158 as shown in FIG. 14, whereupon the spacecraft 10 ca be operated to return to the mother spaceship for on-orbit repair of the satellite 158. Subsequently, the multipurpose spacecraft 10 can be reused to return and release the satellite 158 within its desired orbit, at which time the spacecraft 10 is free to return to the mother spaceship 10 for performance of a subsequent mission.

A variety of modifications and improvements to the invention described herein are believed to be apparent to one of ordinary skill in the art. For example, the propulsion module 16 provides a convenient and reusable propulsion stage which can be plugged into other space vehicles to provide propulsion capacity therefor, with the space vehicle including appropriate electrical and mechanical interfaces and flight control avionics. Alternatively, the short reange vehicle may be coupled to other propulsion module configurations to meet other mission requirements. Accordingly, no limitation on the invention is intended by way of the description herein, except as set forth in the appended claims.

What is claimed is:

1. A multipurpose modular spacecraft, comprising:
    a short range space vehicle having a generally cylindrical overall configuration with a relatively narrow axial dimension, said vehicle including flight control means for controlling said vehicle during flight in space, said vehicle having an open-sided chamber formed therein in one axial side thereof;
    at least one modular propulsion set for removable mounting onto said vehicle for providing propulsion capacity for relatively short-range missions of said vehicle;
    first means for interfacing said flight control means with said at least one propulsion set for control thereof by said flight control means, said first means comprising electrical fittings on said propulsion set and said vehicle for interengagement when said propulsion set is mounted on said vehicle;
    a propulsion module for removable mounting onto said vehicle in a position nested within said open-sided chamber for providing propulsion capacity for relatively longer range mission of said vehicle; and
    second means for interfacing said flight control means with said propulsion module for control thereof by said flight control means, said second means comprising electrical fittings on said propulsion module and said vehicle for interengagement when said propulsion module is mounted on said vehicle;
    whereby said at least one modular propulsion set and said propulsion module can be replaced quickly and easily in space to refuel the modular spacecraft without requiring any transfer of propellants or fluids in the space environment.

2. The multipurpose modular spacecraft of claim 1 wherein said flight control means comprises a plurality of modular components mounted on said vehicle at externally accessible positions.

3. The multipurpose modular spacecraft of claim 1 wherein said at least one propulsion set comprises a plurality of said propulsion sets for removable mounting onto said vehicle in a respective plurality of predetermined positions accessible from the exterior of said vehicle, said first means comprising means for interfacing each of said propulsion sets with said flight control means.

4. The multipurpose modular spacecraft of claim 3 wherein said plurality of propulsion sets are mounted at said plurality of predetermined positions generally about the periphery of said vehicle.

5. The multipurpose modular spacecraft of claim 4 wherein said flight control means comprises a plurality of modular components mounted on said vehicle generally about the periphery of said vehicle.

6. The multipurpose modular spacecraft of claim 1 wherein said vehicle includes support means about the periphery thereof for supporting said vehicle within the cargo bay of another spaceship.

7. A multipurpose modular spacecraft, comprising:
    short range space vehicle including flight control means for controlling said vehicle during flight in space, said vehicle having an open-sided chamber formed therein;
    at least one modular propulsion set for removable mounting onto said vehicle for providing propulsion capacity for relatively short-range missions of said vehicle;
    first means for interfacing said flight control means with said at least one propulsion set for control thereof by said flight control means;
    a propulsion module for removable mounting onto said vehicle in a position nested within said open-sided chamber for providing propulsion capacity for relatively longer range missions of said vehicle;
    second means for interfacing said flight control means with said propulsion module for control thereof by said flight control means; and
    a close-out plate for removable mounting onto said vehicle in a position nested within said open-sided chamber, said close-out plate being mounted within said chamber during relatively short-range missions and said propulsion module being mounted within said chamber during relatively longer range missions.

8. A multipurpose modular spacecraft, comprising;
a short range space vehicle having a generally cylindrical overall configuration with a relatively narrow axial dimension, said vehicle including flight control means for controlling said vehicle during flight in space, said vehicle having an open-sided chamber formed therein in one axial side thereof;
at least one modular propulsion set for removable mounting onto said vehicle for providing propulsion capacity for relatively short-range missions of said vehicle;
mechanical latch means for removably locking said at least one propulsion set onto said vehicle;
first means for interfacing said flight control means with said at least one propulsion set for control thereof by said flight control means, said first means comprising electrical fittings on said propulsion set and said vehicle for interengagement when said propulsion set is mounted on said vehicle;
a propulsion module for removable mounting onto said vehicle in a position nested within said open-sided chamber for providing propulsion capacity for relatively longer range missions of said vehicle; and
second means for interfacing said flight control means with said propulsion module for control thereof by said flight control means.

9. The multipurpose modular spacecraft of claim 8 wherein said at least one propulsion set comprises a self-contained propulsion engine assembly.

10. The multipurpose modular spacecraft of claim 8 wherein said mechanical latch means comprises interengageable latch components carried respectively by said at least one propulsion set and sad vehicle, and locking means for releasably advancing and retaining said latch components in locked engagement with each other, said electrical fittings being advanced into and retained in engagement with each other upon engagement of said latch components.

11. A multipurpose modular spacecraft, comprising:
a short range space vehicle having a generally cylindrical overall configuration with a relatively narrow axial dimension, said vehicle including flight control means for controlling said vehicle during flight in space, said vehicle having an open-sided chamber formed therein in one axial side thereof;
at least one modular propulsion set for removable mounting onto said vehicle for providing propulsion capacity for relatively short-range missions of said vehicle;
first means for interfacing said flight control means with said at least one propulsion set for control thereof by said flight control means;
a propulsion module for removable mounting onto said vehicle in a position nested within said open-sided chamber for providing propulsion capacity or relatively longer range missions of said vehicle;
mechanical latch means for removably locking said propulsion module onto said vehicle; and
second means for interfacing said flight control means with said propulsion module for control thereof by said flight control means, said second means comprising electrical fittings on said propulsion module and said vehicle for interengagement when said propulsion module is mounted on said vehicle.

12. The multipurpose modular spacecraft of claim 11 wherein said propulsion module includes at least one self-contained propulsion engine assembly.

13. The multipurpose modular spacecraft of claim 11 wherein said mechanical latch means comprises interengageable latch components carried respectively by said propulsion module and said vehicle, and locking means for releasably retaining said latch components in locked engagement with each other, said electrical fittings being retained in engagement with each other upon engagement of said latch components.

14. A multipurpose modular spacecraft, comprising:
a short-range space vehicle having a generally cylindrical overall configuration with a relatively narrow axial dimension, said vehicle including flight control means for controlling said vehicle during flight in space;
at least one modular propulsion set removably mounted on said vehicle for providing propulsion capacity for relatively short-range missions of said vehicle;
first mechanical latch means for removably locking said at least one propulsion set onto said vehicle;
a propulsion module for removably mounting on said vehicle at one axial side thereof for providing propulsion capability for relatively longer range missions of said vehicle;
second mechanical latch means for removably locking said propulsion module onto said vehicle; and
support means about the periphery of said vehicle for supporting said vehicle within the cargo bay of another spaceship;
whereby said at least one modular propulsion set and said propulsion module can be replaced quickly and easily in space to refuel the modular spacecraft without requiring any transfer of propellants or fluids in the space environment.

15. The multipurpose modular spacecraft of claim 14 wherein said flight control means comprises a plurality of modular components mounted on said vehicle at externally accessible positions.

16. The multipurpose spacecraft of claim 14 wherein said vehicle has an open-sided chamber formed therein, said propulsion module being for removable mounting on said vehicle in substantially nested relation within said chamber.

17. The multipurpose modular spacecraft of claim 14 wherein said at least one propulsion set comprises a plurality of said propulsion sets for removable mounting onto said vehicle in a respective plurality of predetermined positions accessible from the exterior of said vehicle.

18. A multipurpose modular spacecraft, comprising:
a short-range space vehicle having a generally cylindrical overall configuration with a relatively narrow axial dimension, said vehicle including flight control means for controlling said vehicle during flight in space;
at least one modular propulsion set removably mounted on said vehicle for providing propulsion capacity for relatively short-range missions of said vehicle;
first mechanical latch means for removably locking said at least one propulsion set onto said vehicle;
first electrical interface means for coupling said flight control means with said propulsion set for control thereof by said flight control means when said propulsion set is mounted on said vehicle;

a propulsion module for removably mounting on said vehicle at one axial side thereof for providing propulsion capability for relatively longer range missions of said vehicle;

second mechanical latch means for releasably locking said propulsion module onto said vehicle;

second electrical interface means for coupling said flight control means with said propulsion module for control thereof by said flight control means when said propulsion module is mounted on said vehicle; and support means about the periphery of said vehicle for supporting said vehicle within the cargo bay of another spaceship.

19. A multipurpose modular spacecraft, comprising:
a short-range space vehicle having an open-sided chamber formed therein, said vehicle including flight control means for controlling said vehicle during flight in space;

at least one modular propulsion set removably mounted on said vehicle for providing propulsion capacity for relatively short-range missions of said vehicle;

a propulsion module for removably mounting on said vehicle in substantially nested relation within said chamber for providing propulsion capability for relatively longer range mission of said vehicle; and a close-out plate for removable mounting onto said vehicle in a position nested within said open-sided chamber, said close-out plate being mounted within said chamber during relatively short-range missions and said propulsion module being mounted within said chamber during relatively longer range missions.

20. A multipurpose modular spacecraft, comprising:
a short-range vehicle having a generally cylindrical overall configuration with an open-sided chamber formed in one axial side thereof, said short-range vehicle including flight control means for controlling said vehicle during flight in space;

a plurality of modular propulsion sets for removable mounting onto said vehicle at respective predetermined positions about the periphery of and accessible from the exterior of said vehicle, said propulsion sets providing propulsion capacity for relatively short-range missions and close-in maneuvering of said vehicle;

first mechanical latch means for removably locking said propulsion sets onto said vehicle;

first electrical interface means for coupling said flight control means with said propulsion sets for control thereof by said flight control means when said propulsion sets are mounted on said vehicle;

a propulsion module for removable mounting onto said vehicle in a position nested within said open-sided chamber for providing propulsion capacity for relatively longer range missions of said vehicle;

second mechanical latch means for removably locking said propulsion module onto said vehicle;

second electrical interface means for coupling said flight control means with said propulsion module for control thereof by said flight control means when said propulsion module is mounted on said vehicle; and a close-out plate for removable mounting onto said vehicle in a position nested within said open-sided chamber, said close-out plate being mounted within said chamber during relatively short-range missions and said propulsion module being mounted within said chamber during relatively longer range missions.

21. The multipurpose spacecraft of claim 20 wherein said vehicle includes a docking mechanism for docking with another spaceship.

22. The multipurpose modular spacecraft of claim 20 wherein said vehicle and said propulsion module each include a grapple fixture.

23. The multipurpose modular spacecraft of claim 20 wherein said vehicle includes support means for supporting said vehicle within the cargo bay of another spaceship.

24. The multipurpose modular spacecraft of claim 20 wherein said second mechanical latch means comprises a plurality of trunnion pins on said propulsion module, and a plurality of latch units on said vehicle for respective association with said trunnion pins, said latch units each including latch jaws for releasably engaging the associated one of said trunnion pins and actuator means for moving said latch jaws between closed and opened positions for respectively engaging and releasing the associated trunnion pin.

25. The multipurpose modular spacecraft of claim 24 wherein said actuator means comprises power means and manual override means for selectively and alternatively moving said latch jaws between said closed and opened positions.

26. The multipurpose modular spacecraft of claim 20 wherein said propulsion module has a tunnel tube opening toward said vehicle for reception of a support tube on said vehicle within said chamber, said second mechanical latch means comprising a plurality of striker plates projecting radially inwardly from said tunnel tube, a plurality of latch cranks on said support tube pivotally movable for releasably engaging a plurality of said striker plates, and actuator means for moving said latch cranks between closed and opened positions for respectively engaging and releasing said striker plates.

27. The multipurpose modular spacecraft of claim 26 wherein said actuator comprises power means and manual override means for selectively and alternately moving said actuator means between said closed and opened positions.

28. The multipurpose modular spacecraft of claim 20 wherein said propulsion module has a tunnel tube opening toward said vehicle for reception of a support tube on said vehicle within said chamber, said second mechanical latch means comprising first latch components cooperatively engageable between said tunnel tube and said support tube, and second latch components cooperatively engageable between the outer periphery of said propulsion module and said vehicle generally adjacent the outer periphery of said chamber.

29. A multipurpose modular spacecraft, comprising:
a short range space vehicle having a generally cylindrical overall configuration with a relatively narrow axial dimension, said vehicle including flight control means for controlling said vehicle during flight in space, said vehicle having an open-sided chamber formed therein in one axial side thereof;

at least one modular propulsion set for removable mounting onto said vehicle for providing propulsion capacity for relatively short-range missions of said vehicle;

first means for interfacing said flight control means with said at least one propulsion set for control thereof by said flight control means;

a propulsion module for removable mounting onto said vehicle in a position nested within said open-sided chamber for providing propulsion capacity for relatively longer range missions of said vehicle; and second means for interfacing said flight control means with said propulsion module for control thereof by said flight control means;

wherein said propulsion module has a tunnel tube opening toward said vehicle for reception of a support tube on said vehicle within said chamber, and further including mechanical latch means comprising a plurality of striker plates projecting radially inwardly from said tunnel tube, a plurality of latch cranks on said support tube movable for releasably engaging a plurality of said striker plates and actuator means for moving said latch cranks between closed and opened positions for respectively engaging and releasing said striker plate.

30. A multipurpose modular spacecraft, comprising:

a short range space vehicle having flight control means for controlling the vehicle during flight in space;

at least one modular propulsion set removably mounted on the vehicle to provide propulsion capacity for relatively short-range missions of the vehicle; and a propulsion module removably mounted on the vehicle to provide propulsion capacity for relatively long-range missions of the vehicle;

wherein the vehicle has an open-sided chamber formed therein, the propulsion module being removably mounted on the vehicle in substantially nested relation within the chamber;

and wherein the at least one modular propulsion set and the propulsion module can be replaced quickly and easily in space to refuel the modular spacecraft without requiring any transfer of propellants or fluids in the space environment.

31. The multipurpose modular spacecraft of claim 30, and further including:

a close-out plate for removable mounting onto the vehicle in a position nested within the open-sided chamber, the close-out plate being mounted within the chamber during relatively short-range missions and the propulsion module being mounted within the chamber during relatively longer-range missions.

32. A multipurpose modular spacecraft, comprising:

a short range space vehicle having flight control means for controlling the vehicle during flight in space;

at least one modular propulsion set removably mounted on the vehicle to provide propulsion capacity for relatively short-range missions of the vehicle;

a propulsion module removably mounted on the vehicle to provide propulsion capacity for relatively long-range missions of the vehicle;

first mechanical latch means for removably locking the at least one propulsion set onto the vehicle;

first electrical interface means for coupling the flight control means with the propulsion set for control thereof by the flight control means when the propulsion set is mounted on the vehicle;

second mechanical latch means for releasably locking the propulsion module onto the vehicle; and second electrical interface means for coupling the flight control means with the propulsion module for control thereof by the flight control means when the propulsion module is mounted on the vehicle;

wherein the at least one modular propulsion set and the propulsion module can be replaced quickly and easily in space to refuel the modular spacecraft without requiring any transfer of propellants or fluids in the space environment.

33. A multipurpose modular spacecraft, comprising:

a short range space vehicle having flight control means for controlling the vehicle during flight in space;

a plurality of modular propulsion sets removably mounted on the vehicle in a respective plurality of predetermined positions accessible from the exterior of the vehicle to provide propulsion capacity for relatively short-range missions of the vehicle;

a propulsion module removably mounted on the vehicle to provide propulsion capacity for relatively long-range missions of the vehicle;

wherein the plurality of modular propulsion sets and the propulsion module can be replaced quickly and easily in space to refuel the modular spacecraft without requiring any transfer of propellants or fluids in the space environment.

* * * * *